F. VOEGELI.
TRACTION WHEEL.
APPLICATION FILED MAR. 27, 1919.
1,308,513.
Patented July 1, 1919.
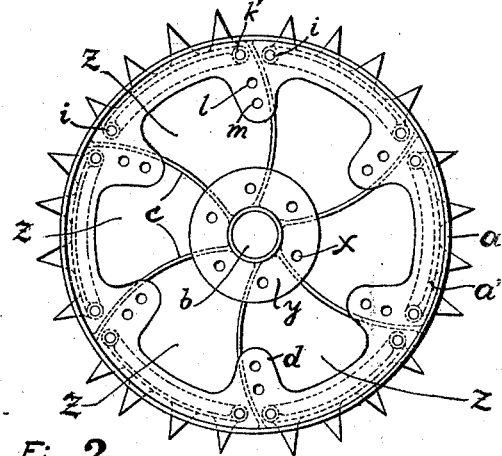
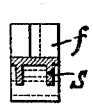
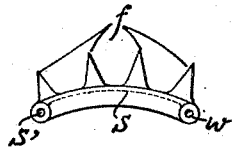
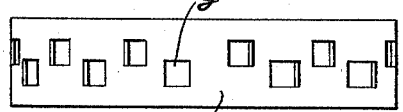
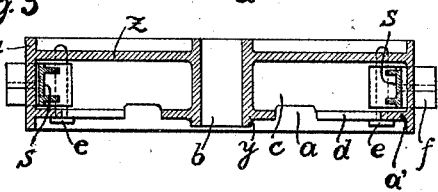
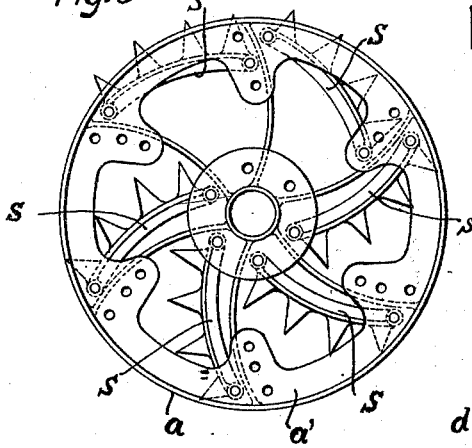
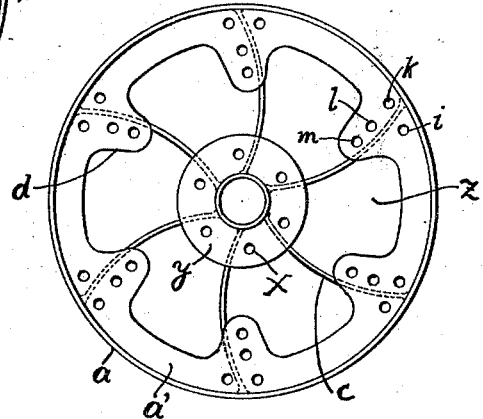
Inventor
Friedrich Voegeli
his Attorney

UNITED STATES PATENT OFFICE.

FRIEDRICH VOEGELI, OF BERNE, SWITZERLAND.

TRACTION-WHEEL.

1,308,513.	Specification of Letters Patent.	Patented July 1, 1919.

Application filed March 27, 1919. Serial No. 285,672.

*To all whom it may concern:*

Be it known that I, FRIEDRICH VOEGELI, a citizen of the Swiss Confederation, and residing at Berne, Switzerland, have invented certain new and useful Improvements in Traction-Wheels, of which the following is a specification.

The present invention has reference to new and useful improvements in traction wheels and relates more particularly to a combination traction wheel for self propelled vehicles of various kinds, such as for instance motor plows, power drills and other agricultural vehicles, tractors, and the like, and the object of the invention is to provide a traction wheel for such power vehicles which can readily be changed from a plain, flat-tread wheel into one presenting a spiked, soil-gripping rim and vice versa, to readily adapt the wheel to the kind and condition of the ground traveled over.

With this object in view the invention essentially resides in the construction, arrangement and coöperation of parts as will now be described in detail with reference to the accompanying drawing, in which Figure 1 is a side view of my new combination traction wheel with the soil gripping members protruding through the wheel rim in full operative position; Fig. 2 is a plan view of the wheel rim, showing the cut-outs therein for the passage of the soil grippers; Fig. 3 represents a vertical section through Fig. 1; Fig. 4 is a side view of the wheel, with the spike carriers removed; Fig. 5 is a side elevation of the wheel, with the spike carriers in various relative positions; Fig. 6 represents a side view of a spike carrier unit, Fig. 7 a cross-section therethrough, and Fig. 8 a top view thereof.

The wheel essentially comprises the hub $b$, the rim $a$, and the connecting disk member $z$ with strengthening ribs $c$. The rim $a$ is provided with a series of cut-outs $g$, which may be in any desired arrangement, for instance staggered as shown, and which serve to allow the passage of the soil gripping members, the spikes $f$. The latter are secured on swinging carrier segments $s$ which at their one eye-end $s'$ are pivotally mounted upon bolts $e$ whose extremities are respectively fixed in alined bores $i$ in the wheel disk $z$ and in a flange $a'$ inwardly extending from the wheel rim $a$. With these spike segments in full operative position (Fig. 1) the spikes extend through the cut-outs $g$ in the wheel rim to their fullest extent. The spike segments are locked in this position by means of bolts $k'$ passing through holes $k$ provided in inwardly directed tongue-shaped extensions $d$ of the rim flange $a'$ and through the free end-eye $w$ of each segment. For having the spikes protrude to a lesser extent beyond the wheel periphery the respective segment ends $w$ are respectively bolted to the flange extensions $d$ by using the further inwardly located holes $l$ or $m$. In the inoperative position, when completely withdrawn into the wheel interior, the swinging segments at their ends $w$ are bolt-locked to the hub flange $y$, provided with bolt holes $x$. By means of the series of bolt holes $k$, $l$, $m$, $x$ the segments $s$ can be locked in the several relative positions shown in Fig. 5, with the spikes projecting to their maximum, or partly or wholly withdrawn into the wheel interior.

This arrangement of the spikes on the swinging segments, lockable in different relative positions, offers the great advantage that, according to the conditions of the ground to be traveled over by the vehicle, either the maximum spike extension or only a part thereof can be made useful, and that on a hard level road the wheel can be used with a plain, flat tread, with the spikes completely withdrawn into the wheel interior.

Obviously, instead of arranging the spikes in staggered relation as shown they might be arranged in a single row or in several rows with respectively laterally alined spikes, and for operatively displacing the spikes and securing them in their several operative and inoperative positions other means than those shown may be used.

What I claim is:—

1. In a traction wheel of the character described, the combination with a hub and a perforated rim, of a member connecting said hub and said rim, a soil gripping member having one end pivotally supported adjacent said rim and provided with projections adapted to extend through the perforations in the rim, and means whereby the other end of said soil gripping member may be releasably locked to said hub.

2. In a traction wheel of the character described, the combination with a hub and a perforated rim, of a member connecting said hub and rim, a projecting flange carried by said hub, a soil gripping member having one end pivotally supported adjacent said rim, and provided with projections adapted to extend through the perforations in the rim, and means whereby the other end of said soil gripping member may be releasably locked to said flange.

3. In a traction wheel of the character described, the combination with a hub and a perforated rim, of a member connecting said hub and rim, a tongue extending from said rim toward said hub, said tongue having perforations therein, a flange projecting from said hub toward said rim and having perforations therein, a soil gripping member having an orifice at either end thereof and provided with projections adapted to extend through the perforations in the rim, and means designed to pass through said orifices and the perforations in the tongue and those in said flange, respectively to connect the opposite ends of the soil gripping member to the tongue and flange.

4. In a traction wheel for self propelled vehicles, in combination, a hub, a rim having cut-outs therethrough, a disk member connecting said hub and said rim, a flange to said hub, a flange inwardly extending from said rim spaced apart from said connecting disk, tongue extensions on said rim flange, a plurality of independent carrier segments, means for pivotally suspending one end of said segments between said disk member and said rim flange, means for selectively locking the other end of said segments in different operative positions to said tongue extensions of said rim flange and for locking them in inoperative position to said hub flange, and soil-engaging members on the outer faces of said swinging segments adapted to coöperate with the cut-outs in said wheel rim and to extend therethrough to a larger or lesser extent beyond the rim periphery depending upon the relative position of said segments.

FRIEDRICH VOEGELI.

Copies of this patent may be obtained for five cents each, by addressing the "Commissioner of Patents, Washington, D. C."